US012203608B1

(12) United States Patent
Heberle et al.

(10) Patent No.: US 12,203,608 B1
(45) Date of Patent: Jan. 21, 2025

(54) ILLUMINATION DEVICE

(71) Applicants: Phillip R. Heberle, Canandaigua, NY (US); James R. Heberle, Shortsville, NY (US); Christopher P. Gardner, Pittsford, NY (US)

(72) Inventors: Phillip R. Heberle, Canandaigua, NY (US); James R. Heberle, Shortsville, NY (US); Christopher P. Gardner, Pittsford, NY (US)

(73) Assignee: Phillip R. Heberle, Canandaigua, NY (US)

( * ) Notice: Subject to any disclaimer, the term of this patent is extended or adjusted under 35 U.S.C. 154(b) by 0 days.

(21) Appl. No.: 18/899,970

(22) Filed: Sep. 27, 2024

(51) Int. Cl.

| | |
|---|---|
| ***F21L 4/00*** | (2006.01) |
| ***B67B 7/14*** | (2006.01) |
| ***F21V 21/06*** | (2006.01) |
| ***F21V 23/04*** | (2006.01) |
| ***F21V 33/00*** | (2006.01) |
| *F21Y 105/18* | (2016.01) |

(52) U.S. Cl.
CPC ................ *F21L 4/005* (2013.01); *B67B 7/14* (2013.01); *F21V 21/06* (2013.01); *F21V 23/0421* (2013.01); *F21V 33/0084* (2013.01); *F21Y 2105/18* (2016.08)

(58) Field of Classification Search
CPC ........... F21W 2131/20; F21W 2131/30; F21W 2111/10; F21V 35/003; F21V 33/0068; F21V 33/0084; F21V 23/0421; F21V 21/06; F21Y 2105/18; F21L 4/005; F21L 4/022; F21L 4/027
See application file for complete search history.

(56) References Cited

U.S. PATENT DOCUMENTS

| | | | | |
|---|---|---|---|---|
| D366,813 | S | 2/1996 | Nobles | |
| 8,814,379 | B2 | 8/2014 | Griffiths et al. | |
| 10,058,204 | B2 | 8/2018 | Kuo et al. | |
| 10,773,897 | B2 * | 9/2020 | Schroader | B65G 47/54 |
| 11,713,174 | B1 * | 8/2023 | Young | B65D 51/1611 362/154 |

(Continued)

FOREIGN PATENT DOCUMENTS

| | | | | |
|---|---|---|---|---|
| DE | 202010012785 U1 * | 2/2011 | | A47G 23/0309 |
| KR | 100524764 B1 * | 10/2005 | | E01F 9/553 |
| KR | 101992737 B1 * | 6/2019 | | B05B 15/16 |

OTHER PUBLICATIONS

Machine translation of DE202010012785U1, retrieved from worldwide.espacenet.com on Nov. 21, 2024 (Year: 2024).*

(Continued)

*Primary Examiner* — Abdulmajeed Aziz
*Assistant Examiner* — Steven Y Horikoshi
(74) *Attorney, Agent, or Firm* — Jong Patent Firm; Cheng Ning Jong; Tracy P. Jong

(57) ABSTRACT

An illumination device including a handhold member including a structure including a dome and a base of the dome, the dome configured to be held in a user's hand, within a space outlined by a cradle or disposed on a surface; and a plurality of light emitting devices disposed on the base, the plurality of light emitting devices configured to be disposed about a central axis of the base and the plurality of light emitting devices configured to be inclined at an angle towards the central axis, wherein an object disposed on the base can be illuminated.

20 Claims, 14 Drawing Sheets

(56) References Cited

U.S. PATENT DOCUMENTS

| | | | | |
|---|---|---|---|---|
| 2016/0003444 | A1* | 1/2016 | Dennis | F21S 41/147<br>362/235 |
| 2016/0297583 | A1* | 10/2016 | Staeben | B65D 47/0804 |
| 2022/0074585 | A1* | 3/2022 | Hintz | F21K 2/00 |

OTHER PUBLICATIONS

Machine translation of KR100524764B1, retrieved from worldwide.espacenet.com on Nov. 21, 2024 (Year: 2024).*

Machine translation of KR101992737B1, retrieved from worldwide.espacenet.com on Nov. 21, 2024 (Year: 2024).*

* cited by examiner

ILLUMINATION DEVICE

BACKGROUND OF THE INVENTION

1. The Field of the Invention

The present invention relates to an illumination device. More specifically, the present invention is directed to a device to illuminate the label on medicine bottles or other articles in low light conditions, and to act as a bottle opener to ease the removal of caps from medicine bottles or other articles.

2. Background Art

Traditional medicine containers or bottles are generally used to safely store pills or medicines for patients to access in time of need. Many, especially aging patients with diminished, low or compromised vision, are prescribed medicines for various ailments that come in multiple pill containers. Some pills are taken at regular intervals, e.g., daily, after a meal or when the patient experiences one or more symptoms of a condition. With more than one pill bottle, the ability to retrieve the right pill or pills is critical to avoid the consumption of the wrong pills which can have grave effects on the patient due to an overdose of a particular medicine while not having the right pill or pills to address the condition at hand. Therefore, it is critical for a patient to retrieve one or more pills from the right container. This however can be a challenge, especially if the patient has diminished, low or compromised vision while the patient is required to take more than one medicine and the pills come in similarly or identically-shaped and sized containers where the only distinguishing feature of one bottle from another is the label disposed on the bottle often having small prints indicating the contents of the bottle. When a medication is required under low light conditions and when the patient is not fully awake, e.g., when the patient wakes up from sleep, the patient must still ascertain the appropriate medication is being taken. It is under these conditions when the patient will most likely confuse one medication bottle for another. In addition, many patients have difficulty opening the cap on medicine bottles and would benefit from a bottle opening device and would benefit from a device to illuminate the label on the pill bottle. Patients would also benefit from an illumination device that is multifunctional in that it can be free-standing and adjusted to various desired angles to illuminate an object of interest such as an ornamental plant in a living space or to provide mood lighting, or it can be hand-held as a flashlight to retrieve a dropped pill in low light conditions. Many patients with low wrist dexterity have difficulty opening the cap on medicine bottles and would benefit from a bottle opening device which also illuminates the outer surfaces of the bottles simultaneously.

Various attempts have been made in the past to try to increase and improve compliance by patients to take their medication correctly in low light conditions or to improve the ease with which illumination devices can be used to illuminate various other articles.

U.S. patent Ser. No. 10/058,204 to Kuo et al. (Hereinafter Kuo) discloses a luminous base includes a base body, a light guide structure, a light emitting module and a power supply module. The base body has a cover with a light outlet. The light guide structure is installed at the base body and configured to be corresponsive to the light outlet. The light emitting module is installed in the base body for projecting light towards the light guide structure. The power supply module is electrically connected to the light emitting module. Light can be illuminated upwardly from the bottom of a cup and/or a beverage bottle in a surface emitting manner, and the existence of the cup and/or the beverage bottle can be highlighted to provide a glare effect in a dark environment, and the light can be illuminated uniformly upward from the bottom of the cup and/or the beverage bottle to provide a light staining effect. Although Kuo claims a luminous base having a light guide structure and a cover with a shading wall in one instance and a luminous base having a light guide structure that is a light guide pattern and a base body having a hole disposed in the light guide pattern, it neither discloses a bottle opening device nor a handhold portion which allows it to be held in one's hand if desired.

U.S. Pat. No. 8,814,379 to Griffiths et al. (Hereinafter Griffiths) discloses a self-contained illumination device for attachment to a container, e.g., to the base of a bottle. Griffiths' device includes a printed circuit board with LEDs attached to the central region of a liquid-impervious flexible pad. The central region is surrounded by an annular adhesive region which is arranged to attach the pad to the container in liquid-tight manner. The pad includes a base layer of plasticized paper or PVC, covered by an adhesive layer and, before attachment to the container, a peripheral layer of a release paper. Griffiths discloses a device having LEDs disposed in a pad. However, the 4-6 LEDs do not appear to be disposed at an inwardly-inclined angle, its pad is partially liquid-filled and flexible and capable of being adhered to a container. Griffiths fails to disclose a handhold portion and a switch suitably disposed on its device to facilitate the control of its LEDs.

U.S. Pat. No. D366813 of Nobles (Hereinafter Nobles) discloses an illuminated coaster. Nobles discloses what appears to be a base having a platform for supporting an item to be illuminated and LEDs disposed around this platform. It appears that the LEDs are not disposed at an inwardly-inclined angle. Again, Nobles fails to disclose a handhold portion, a switch suitably disposed on its device to facilitate the control of its LEDs or a bottle opening capability.

There exists a need for an illumination device that can be conveniently held in one's hand if desired to function as an illuminator for a bottle or a bottle cap opener in one mode and one that can be conveniently disposed on a surface to support and illuminate a bottle disposed thereon in another mode.

SUMMARY OF THE INVENTION

In accordance with the present invention, there is provided an illumination device including:

(a) a handhold member including a structure including a dome and a base of the dome, the dome configured to be held in a user's hand, within a space outlined by a cradle or disposed on a surface; and (b) a plurality of light emitting devices disposed on the base, the plurality of light emitting devices configured to be disposed about a central axis of the base and the plurality of light emitting devices configured to be inclined at an angle towards the central axis, wherein an object disposed on the base can be illuminated.

In one embodiment, the angle is about 5 to about 45 degrees. In one embodiment, the illumination device further includes a pushbutton switch configured to control the activation of the plurality of light emitting devices, wherein the pushbutton switch is disposed on the apex of the dome. In one embodiment, the illumination device further includes a pushbutton switch configured to control the activation of the plurality of light emitting devices, wherein the pushbutton switch is disposed on the base. In one embodiment, the illumination device further includes a bottle cap opener configured to assist in the opening of a bottle, wherein the bottle cap opener is disposed on the base. In one embodiment, the bottle cap opener includes a friction pad disposed in the base. In one embodiment, the bottle cap opener includes a series of stepped levels each corresponding to a different diameter size of a bottle cap of the bottle. In one embodiment, the illumination device further includes a cradle having a space outlined by the cradle, the space configured to receive the dome at contact surfaces of the cradle. In one embodiment, the contact surfaces of the cradle are concave surfaces. In one embodiment, at least one of the plurality of light emitting devices can be a light emitting diode (LED), an incandescent lamp, a halogen lamp, a compact fluorescent lamp (CFL), a high intensity discharge (HID) lamp, a gas discharge lamp or a laser diode.

In accordance with the present invention, there is provided an illumination device including:

(a) a handhold member including a structure comprising a dome and a base of the dome, the dome configured to be held in a user's hand;

(b) a plurality of light emitting devices disposed on the base, the plurality of light emitting devices configured to be disposed about a central axis of the base; and (c) a cradle having a space outlined by the cradle, wherein the space is configured to receive the dome at contact surfaces of the cradle such that the handhold member is positionable in a plurality of orientations.

In one embodiment the plurality of light emitting devices are configured to be inclined at an angle towards said central axis. In one embodiment, the angle is about 5 to about 45 degrees. In one embodiment, the illumination device further includes a pushbutton switch configured to control the activation of the plurality of light emitting devices, wherein the pushbutton switch is disposed on the apex of the dome. In one embodiment, the illumination device further includes a pushbutton switch configured to control the activation of the plurality of light emitting devices, wherein the pushbutton switch is disposed on the base. In one embodiment, the illumination device further includes a bottle cap opener configured to assist in the opening of a bottle, wherein the bottle cap opener is disposed on the base. In one embodiment, the bottle cap opener includes a friction pad disposed in the base. In one embodiment, the bottle cap opener includes a series of stepped levels each corresponding to a different diameter size of a bottle cap of the bottle. In one embodiment, the illumination device further includes a cradle having a space outlined by the cradle, the space configured to receive the dome at contact surfaces of the cradle. In one embodiment, the contact surfaces of the cradle are concave surfaces. In one embodiment, at least one of the plurality of light emitting devices can be a light emitting diode (LED), an incandescent lamp, a halogen lamp, a compact fluorescent lamp (CFL), a high intensity discharge (HID) lamp, a gas discharge lamp or a laser diode.

An object of the present invention is to provide an illumination device to illuminate the printed label on a medicine bottle in low light conditions to ensure a patient takes the correct medication, where the illumination device can be adapted to the medicine bottle without modifying the medicine bottle and without undue effort.

Another object of the present invention is to provide an illumination device that can function as a bottle opener to allow patients with limited wrist dexterity to open medicine bottles of various different sizes while illuminating the outer surfaces of the bottles simultaneously.

Another object of the present invention is to provide an illumination device that can be stably supported on a cradle supported on a table, countertop, or other flat surface to provide direct illumination to an item to be examined, or highlighted, such as a plant, sculpture, or painting.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—illumination device
4—handhold member
6—dome
8—bottle opener
10—bottle
12—bottle body
14—serrated bottle cap
16—bottle label
18—cradle
20—inward directed light beam
22—hand
24—base
26—pushbutton switch
27—pushbutton switch
28—incline angle of light emitting devices toward central axis of dome
30—light emitting device
32—cross-sectional profile of stair stepping shape or pattern of the rings within base of handhold member of illumination device
34—supporting surface, e.g., table surface
36—diameter of cradle hole
38—concave surface
40—battery
42—audio device
44—light
46—switch
48—communication module
50—controller
52—friction pads
54—audio device
56—stair stepping ring
58—battery removal door
60—central axis of base Particular Advantages of the Invention The illumination device of the present invention illuminates the printed label on a medicine bottle in low light conditions to ensure a patient takes the correct medication, where the illumination device can be adapted to the medicine bottle without modifying the medicine bottle and without undue effort. In one embodiment, a present illumination device can be adapted to a bottom portion of a medicine bottle to illuminate a label disposed thereon. In another embodiment, a present illumination device can be disposed atop a cap of a medicine bottle to illuminate a label disposed on the medicine bottle, thereby providing a user an option as to the type of adaptation of the illumination device desired. Some users may prefer a present illumination device that is adaptable to a bottom portion of a medicine bottle as it does not interfere with the cap of the medicine bottle which serves as a grasping point of the cap in an effort to open or close the medicine bottle. Some users may prefer a present illumination device that is disposed atop the cap of a medicine bottle as it provides a much larger surface area for the users to grasp the cap in an effort to open or close the medicine bottle. In this option, the illumination device can function as a bottle opener to allow patients with limited wrist dexterity to open medicine bottles of various different sizes. Other types of bottles can also be opened, e.g., those containing juice, soda or water. In another embodiment, the illumination device can be supported on a cradle supported on a table, countertop or a flat surface to provide direct illumination to an item to be examined, or highlighted such as a plant, sculpture or painting.

DETAILED DESCRIPTION OF A PREFERRED EMBODIMENT

Figure 1:
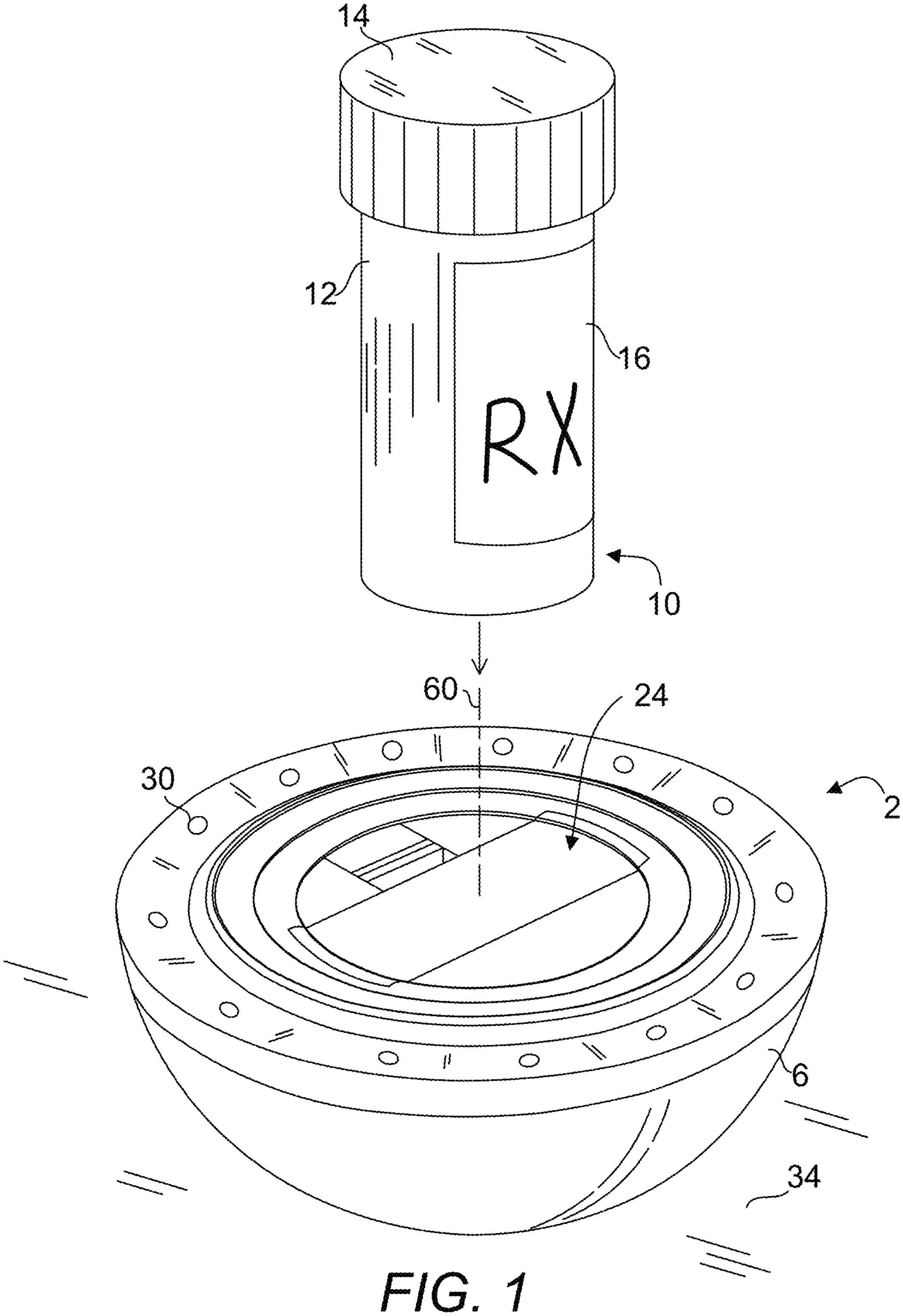
FIG. 1 is a front perspective view of a pill bottle about to be disposed on a base of an illumination device that can be supported on a surface or held in a user's hand.
Figure 2:
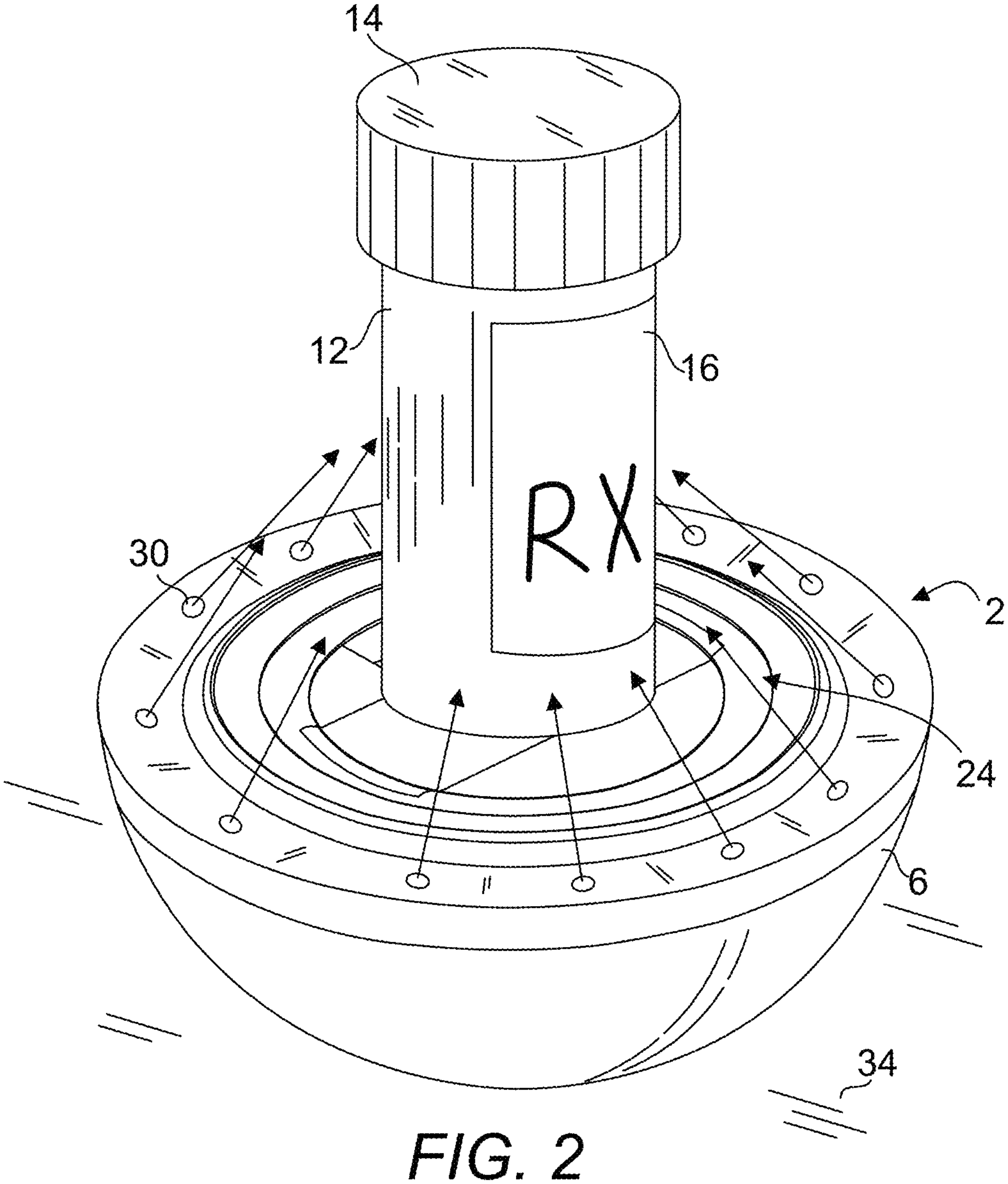
FIG. 2 is a front perspective view of a pill bottle after it has been disposed on a base of an illumination device.

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower). FIG. 1 is a front perspective view of a pill bottle 10 about to be disposed on a base 24 of an illumination device 2 that can be supported on a surface or held in a user's hand. FIG. 2 is a front perspective view of a pill bottle after it has been disposed on a base of an illumination device 2. The illumination device 2 includes a handhold member 4 and plurality of light emitting devices 30. The handhold member 4 includes a dome 6 and a base 24 of the dome. In one aspect, the dome is configured to be held in a user's hand. In another aspect which will be apparent elsewhere herein, the dome is configured to be held by a cradle. The dome may alternatively be disposed and supported on a surface. The plurality of light emitting devices 30 are configured to be disposed about a central axis 60 of the base 24. In one example of use, when the bottle 10 is disposed on the base 24, a pushbutton switch 26 on the base 24 of the handhold member 4 is depressed to actuate the light emitting devices 30, illuminating the bottle label 16 in a darkened surrounding. The light emitting devices 30 are inclined toward the central axis 60 of the base 24 in order to more effectively illuminate the bottle label 16. It shall be understood that a light emitting device 30 can be a light bulb with its output light rays directed in a desired direction or it can be a device having light rays emitted from a light source where the light rays are transmitted through a light transmitting lens that is inclined in the desired direction to subsequently direct the light rays from the light source in the desired direction. Each light emitting device can be a light emitting diode (LED), an incandescent lamp, a halogen lamp, a compact fluorescent lamp (CFL), a high intensity discharge (HID) lamp, a gas discharge lamp or a laser diode.

Figure 3:
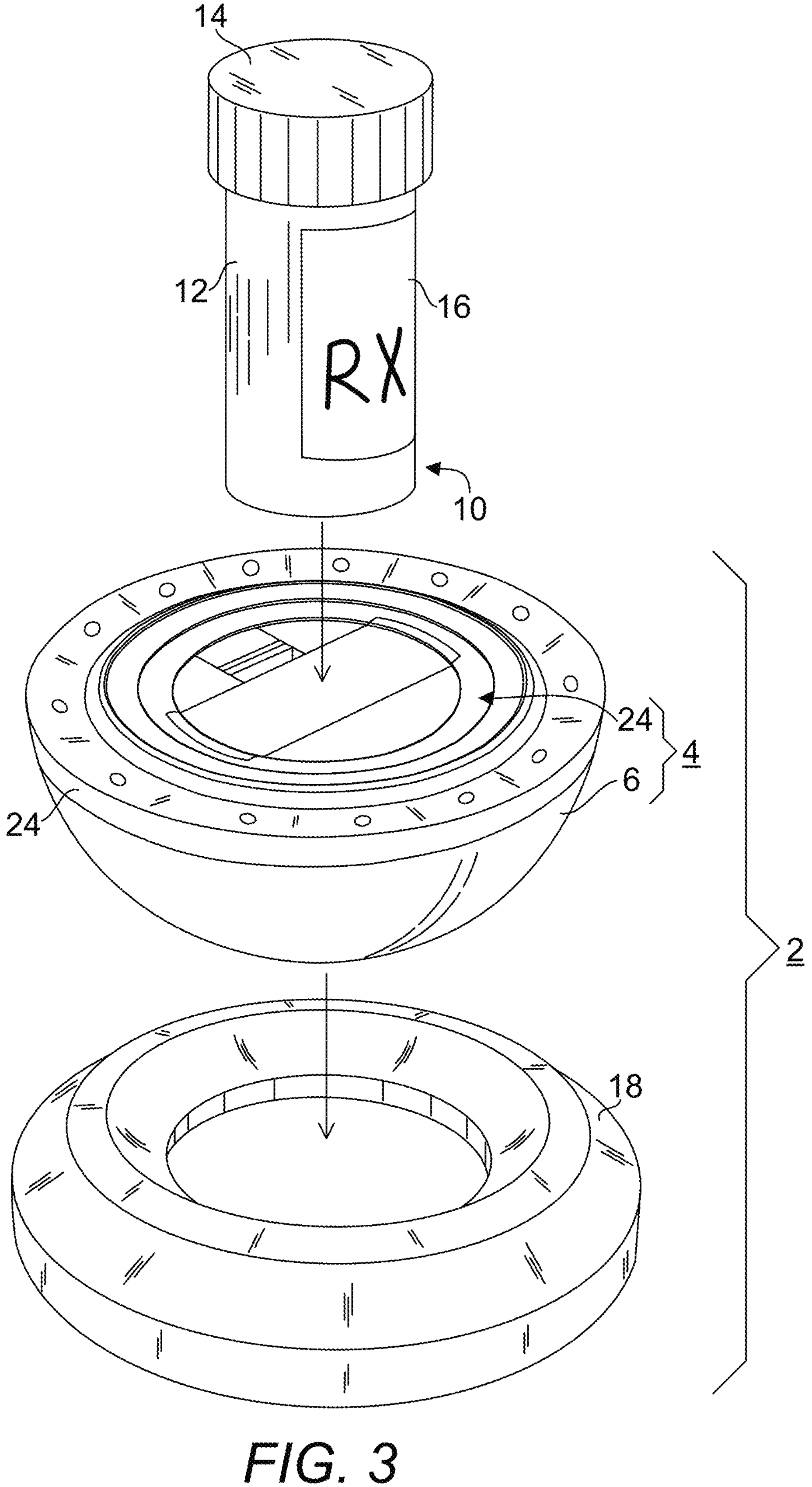
FIG. 3 is a front perspective view of a pill bottle about to be disposed on a base of an illumination device that is to be disposed in a cradle.
Figure 4:
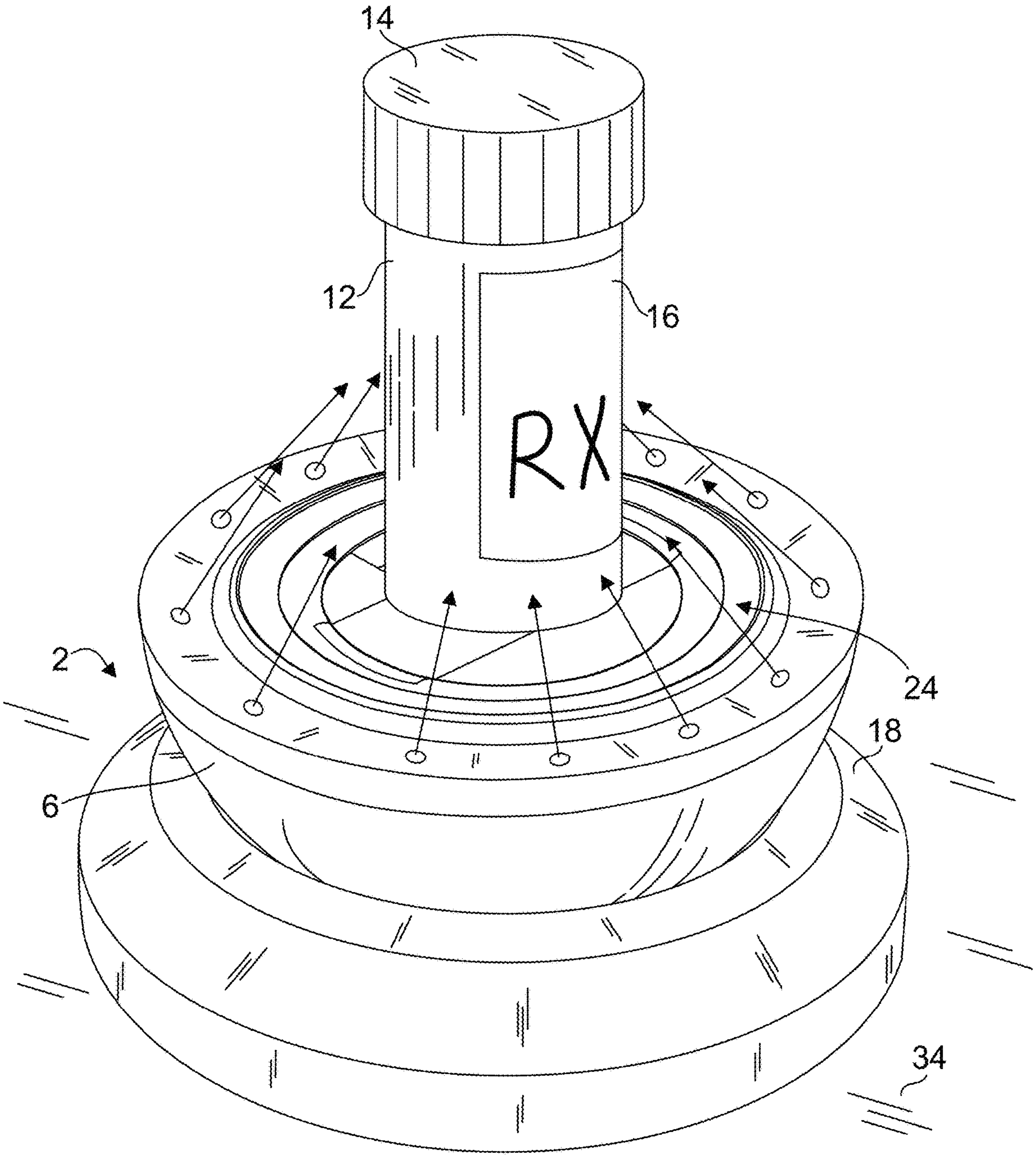
FIG. 4 is a front perspective view of a pill bottle after it has been disposed on a base of an illumination device which is in turn disposed in a cradle.

FIG. 3 is a front perspective view of a pill bottle about to be disposed on a base of an illumination device that is to be disposed in a cradle 18. FIG. 4 is a front perspective view of a pill bottle 10 after it has been disposed on a base 24 of an illumination device which is in turn disposed in a cradle 18. The cradle 18 preferably has a concave surface that matches the curvature of the dome 6.

Figure 5:
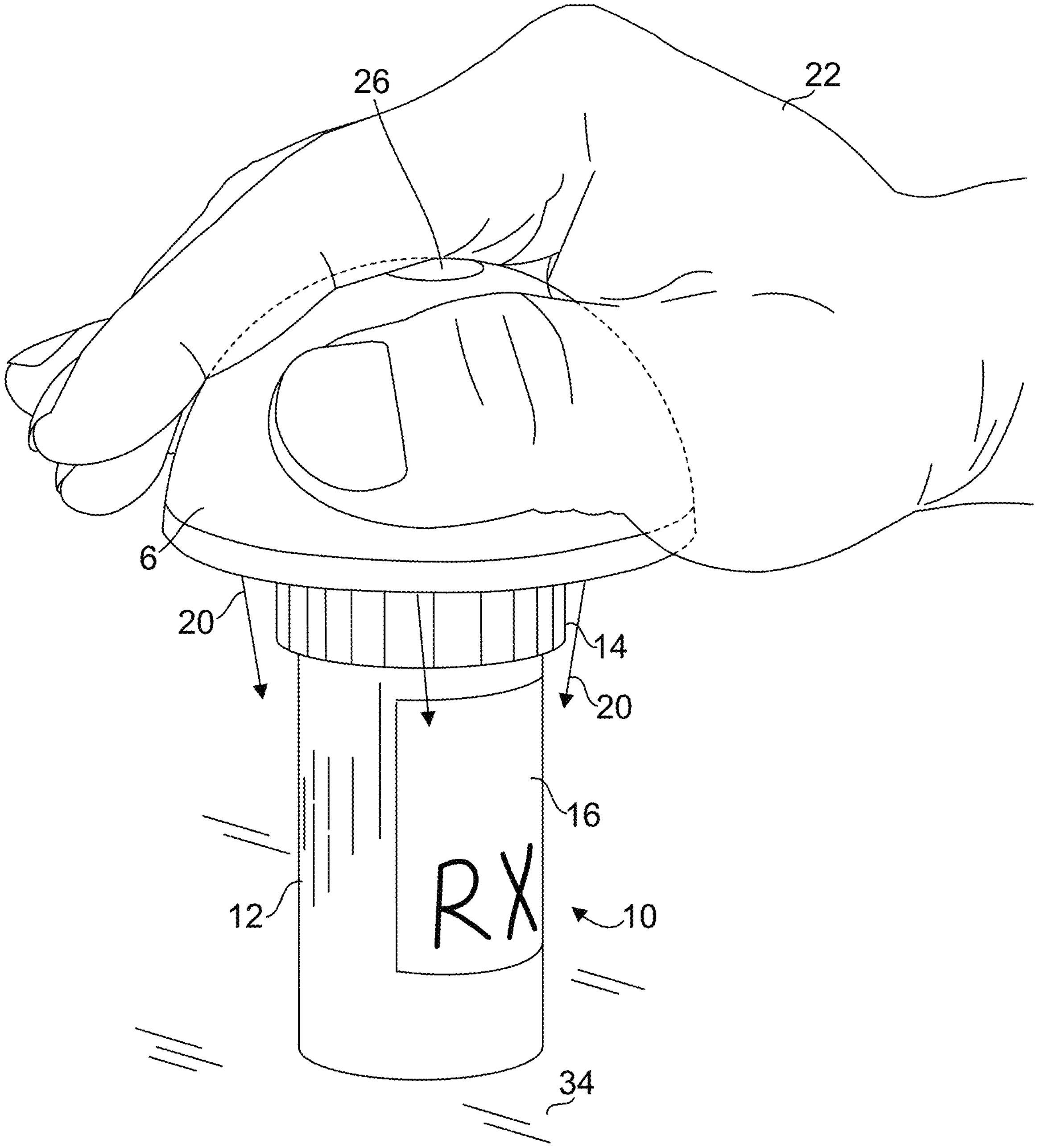
FIG. 5 is a front perspective view of an illumination device placed on a serrated medicine bottle cap.
Figure 6:
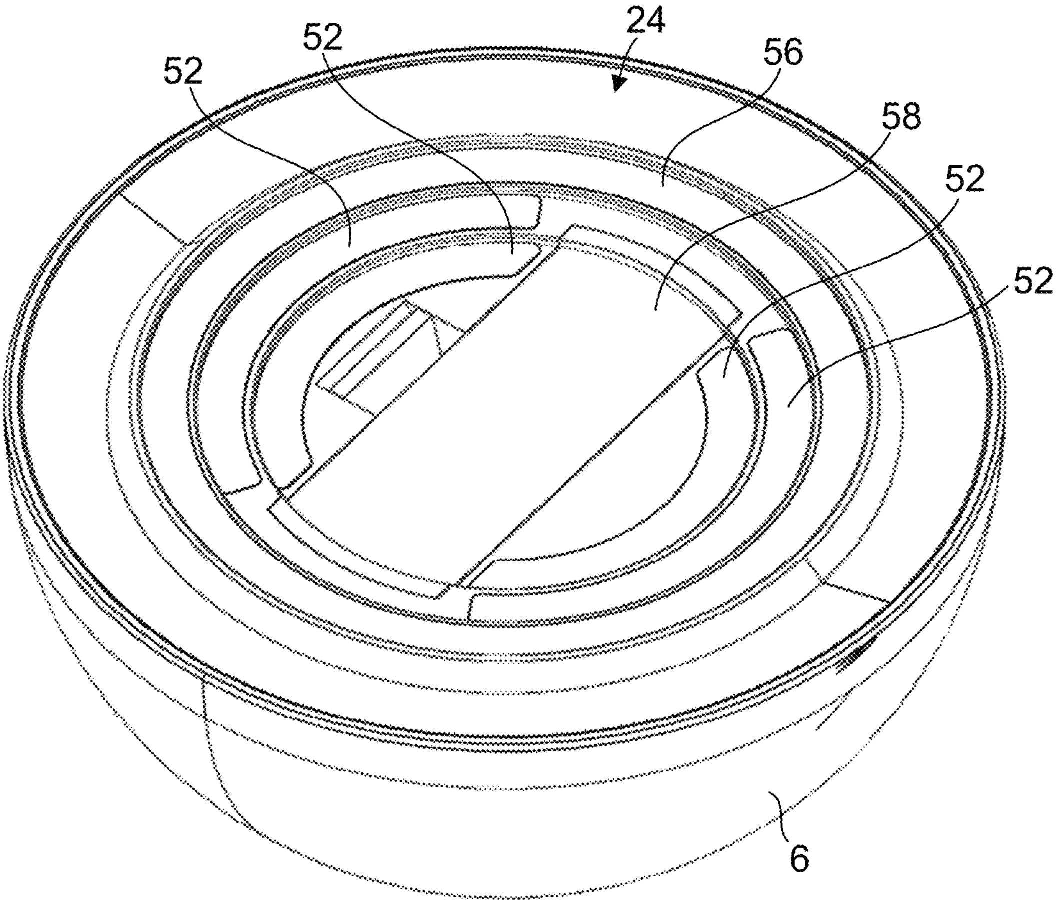
FIG. 6 is a perspective view of the base of the illumination device, showing the three stair stepping rings with friction pads and a battery removal door.
Figure 7:
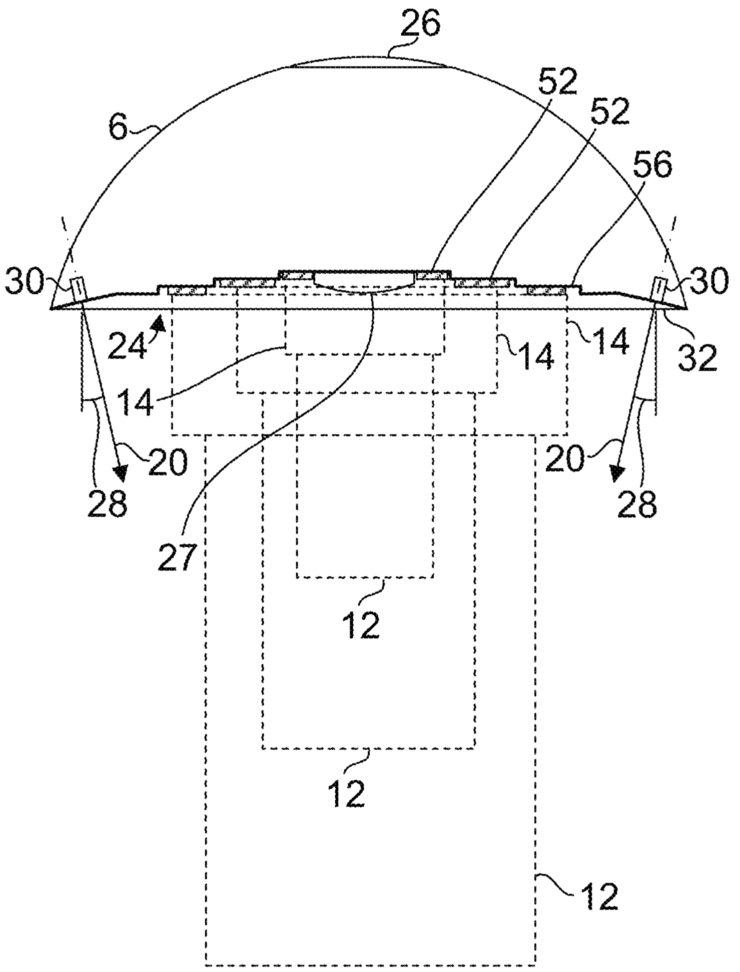
FIG. 7 is a diagram depicting an illumination device placed over the bottle caps of various sizes to be both illuminated and opened.

FIG. 5 is a front perspective view of an illumination device 2 placed on a serrated medicine bottle cap 14. FIG. 6 is a perspective view of the base of the illumination device 2, showing the three stair stepping rings 56 with friction pads 52 and a battery removal door 58. FIG. 7 is a diagram depicting an illumination device 2 placed over the bottle caps 14 of various sizes to be both illuminated and opened. The illumination device is being pushed down vertically sufficiently by a user's hand 22, e.g., fingers, palm, in order to depress the pushbutton switch 26 on the apex of the dome 6, activating the light emitting devices 30 while the user is holding the handhold member in his/her hand. Alternatively, the light emitting devices 30 may be controlled or turned on/off by depressing a pushbutton switch 27 disposed on the base 24 of the illumination device 2, providing some redundancy to ensure illumination when needed. In the embodiment shown, the illumination device 2 also includes a bottle opener on the base 24 of the handhold member 4 of the illumination device 2. The pill bottle 10 typically includes a bottle body 12, bottle label 16, and a bottle cap 14. A cap 14 is typically provided to safely contain the pills therein and a label 16 is affixed to an exterior surface of the bottle body 12 by adhesive. A pharmacist typically uses a generic pill bottle 10 and sticks on a machine-printed label 16, specific to the patient for which the medicine is prescribed with instructions on the dose and frequency of the medicine. To open a bottle 10 to retrieve the medicine, the patient will need to grasp the cap 14, push down sufficiently to turn the cap 14 counter-clockwise with respect to the bottle. This compresses the elastomer gasket between the inner surface of the cap 14 and the top surface of the bottle 10, as well as unlocking a set of interlocking tangs on the cap 14 and bottle 10. The cap 14 frequently has splines on its exterior circumference to increase the friction between the cap 14 and the patient's fingers when the patient is grasping and turning the cap 14. Turning the cap 14 will require sufficient friction between the bottle cap 14 and the base 24 of the illumination device 2 to rotate the cap 14.

The bottle opener includes a series of stepped levels of rings 56 corresponding to different diameter sizes of bottle caps. The stair stepping shape or pattern of the rings 32 within the base 24 of the handhold member 4 are shown in FIGS. 6, 7, 9 and 10. The bottle opener can be used to open caps of various bottles, other than medicine bottles, with twist off caps including soda bottles, juice bottles, etc. For persons with limited hand dexterity due to arthritis or injury, this embodiment may prove exceedingly helpful. Each size of bottle should fit closely within a ring of the illumination device 2, while the pushbutton switch 27 is depressed, actuating light emitting devices 30 on the base 24 of the illuminating device. The stair-step design allows the opener to be versatile, handling various sizes of bottle caps commonly found on different types of bottles, including beer bottles, soda bottles, and other beverage containers. Each step corresponds to a different diameter size of bottle caps. When using the illumination devices as an opener, the user places the appropriate step of the opener on the rim of the bottle cap that matches its size. This ensures a close fit and effective leverage for removing the cap. This design makes it easy for a user to quickly find the right step for the bottle cap the user wants to open, enhancing convenience and efficiency. The opener is portable and can be easily carried in a pocket, bag, or stored in a kitchen drawer. Also shown in FIG. 6 is the removal door 58 to the battery 40 compartment. To open a bottle, a user must grasp the bottle body 12 with one hand while simultaneously pushing down on the dome 6 and rotating the dome counter-clockwise such that the friction pads 52 disposed on the relevant stepped ring 56 provide sufficient grip of the cap 14 to rotate the cap 14 relative to the bottle body 12 held securely by a hand of the user. The stepped levels of rings 56 allow a bottle cap to be seated in a suitably-sized ring of the plurality of rings 56, essentially centering the bottle cap within the space bounded by the suitably-sized ring to allow the hand twist action of the user to be more effectively applied to loosen the bottle cap with respect to the bottle. The inward directed light beams 20 illuminate the bottle label 16 more readily compared to a case if light beams were directed vertically without an incline. In one embodiment, the light emitting devices 30 are inclined at an angle 28 of about 5 to about 45 degrees toward the central axis of dome. This embodiment would be useful to a patient seeking to remove a pill from the bottle in a darkened surrounding. The dome 6 provides a large grasping surface compared to a bottle cap, and will aid patients with limited wrist mobility, due to arthritis or injury, to more easily open their pill bottle.

Figure 8:
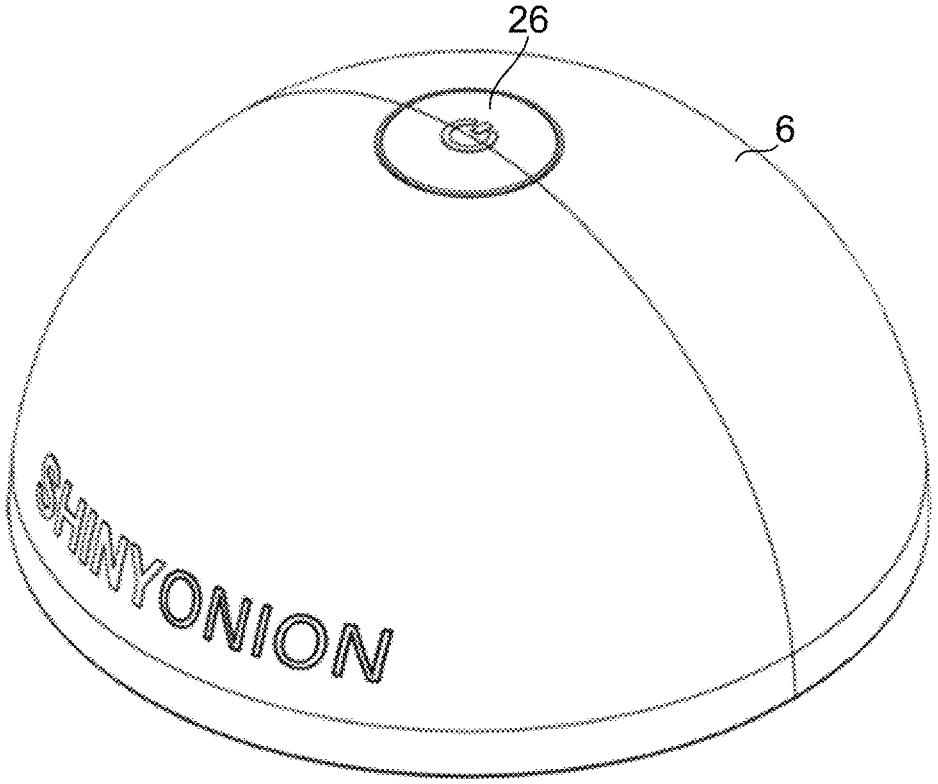
FIG. 8 is a perspective view of the apex of the dome of the illumination device.

FIG. 8 is a perspective view of the apex of the dome of the illumination device 2. A pushbutton switch 26 is mounted on the apex of the dome to actuate the light emitting devices 30 when depressed by the user's hand, as shown in FIG. 5.

Figure 9:
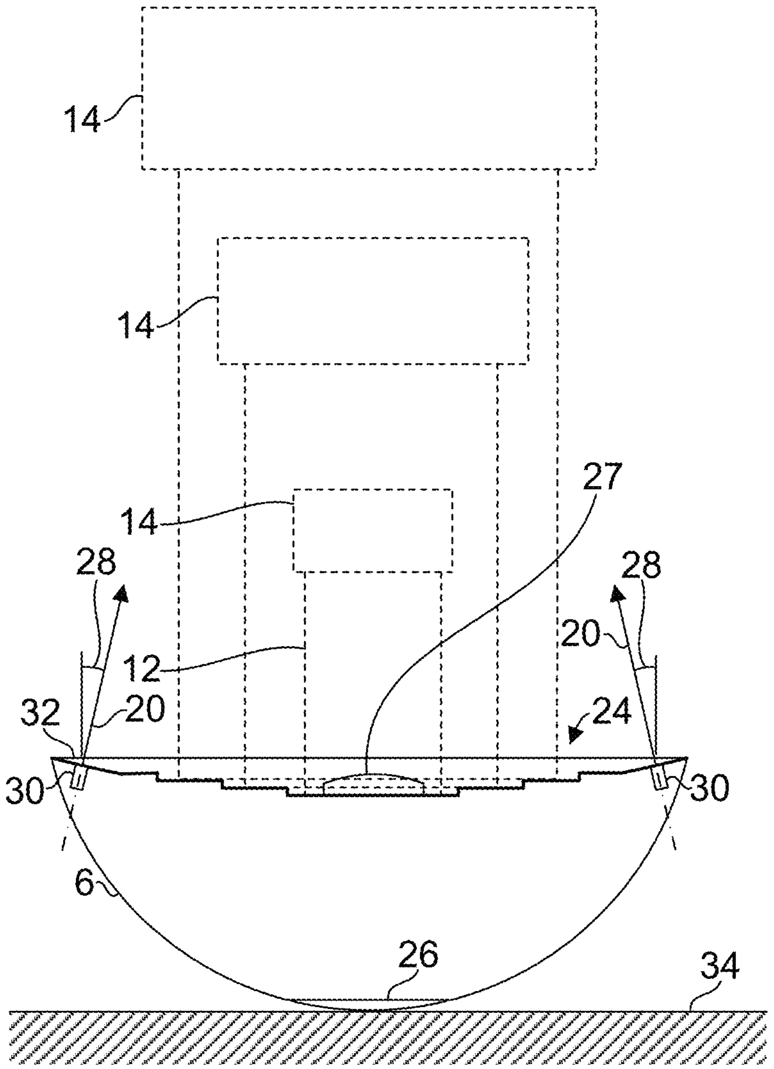
FIG. 9 is a diagram depicting an illumination device supported on a flat surface when used in a bottle illumination mode.

FIG. 9 is a diagram depicting an illumination device 2 supported on a flat surface, e.g., table surface 34 when used in a bottle illumination mode. In the embodiment shown, an additional pushbutton switch 27 is provided and disposed on the base 24. Switch 27 is configured to be depressed by any bottle coming in contact with it. However, a pushbutton switch need not be disposed on base 24 for controlling the light emitting devices 30 when the illumination device 2 is used for supporting and illuminating a bottle. When pushbutton switch 26 on the apex of the dome 6 is used to control the light emitting devices 30, switch 26 can be depressed when the dome 6 is placed on a surface, e.g., a table surface 34 while supporting a bottle that is being pushed downwardly towards the table surface 34.

Figure 10:
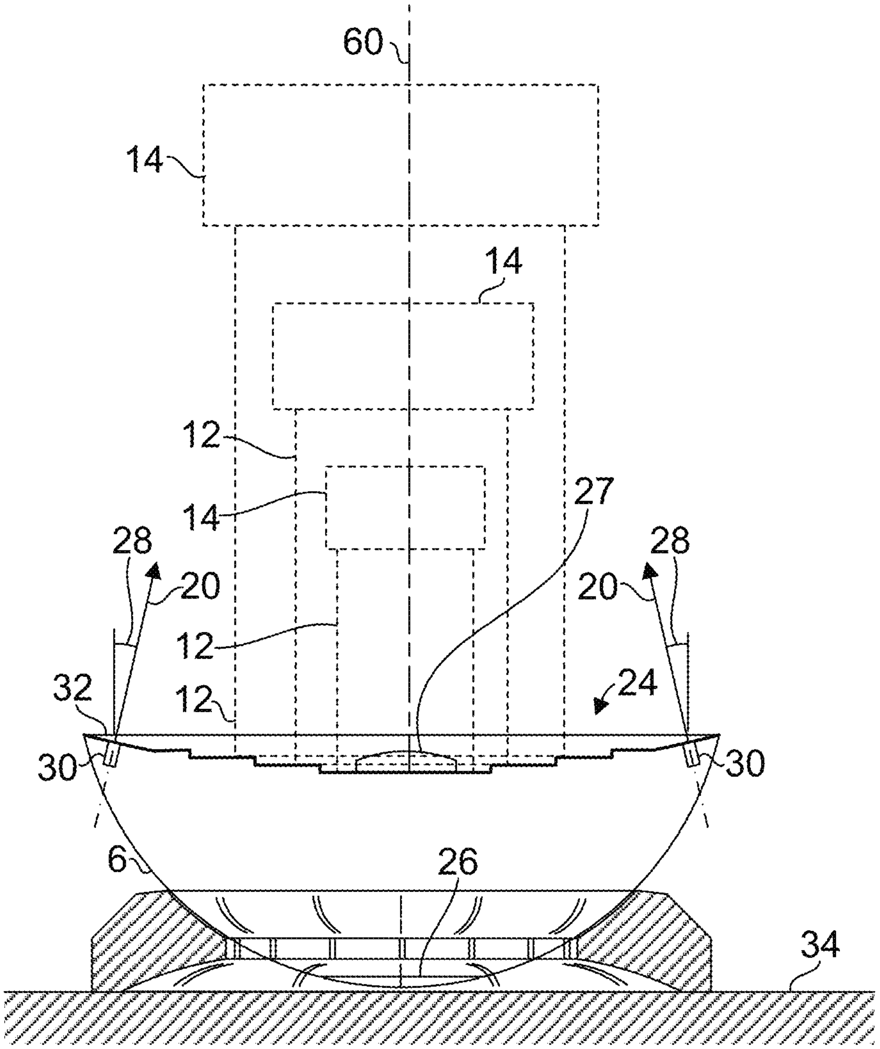
FIG. 10 is a diagram depicting an illumination device securely supported on a cradle with a concave surface on the cradle hole that matches the curvature of the dome of the illumination device.

FIG. 10 is a diagram depicting an illumination device 2 securely supported on a cradle 18 with a concave surface 38 on the cradle hole or a space outlined by the cradle 18, that matches the curvature of the dome 6 of the illumination device 2. The cradle is supported here on a surface, e.g., a table surface 34. It shall be noted that, while the handhold member 4 is supported on the cradle 18, it is possible for the handhold member 4 to maintain a gap between the handhold member 4 and the surface 34 upon which the cradle 18 is supported. In this case, it would be beneficial to use pushbutton switch 27 as a control or turn on/off button as the illumination device 2 would not be required to be displaced to turn the light emitting devices 30 on or off and the position and orientation of the handhold member 4 with respect to the cradle 18 would be maintained. As pushbutton switch 27 is disposed on the base 24, the user can leave the illumination device 2 stably in place while supported on the cradle 18, ready for use until the user places the bottle 10 on the base 24 at which time the label 16 will be illuminated. This is especially important when the position and orientation of the handhold member 4 with respect to the cradle 18 has been selected after much effort has been expended in achieving a desired precise position and orientation, e.g., the position and orientation shown in FIG. 12.

Figure 11:
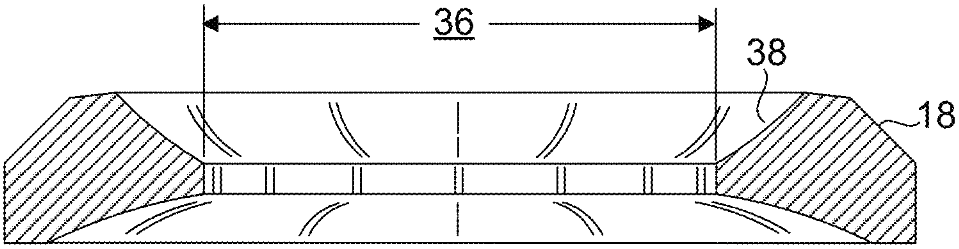
FIG. 11 is a side cross-sectional view of a cradle with a diameter to provide an opening that is large enough to allow the surface of the dome to protrude through the opening to stably support the dome of the illumination device in various orientations.
Figure 12:
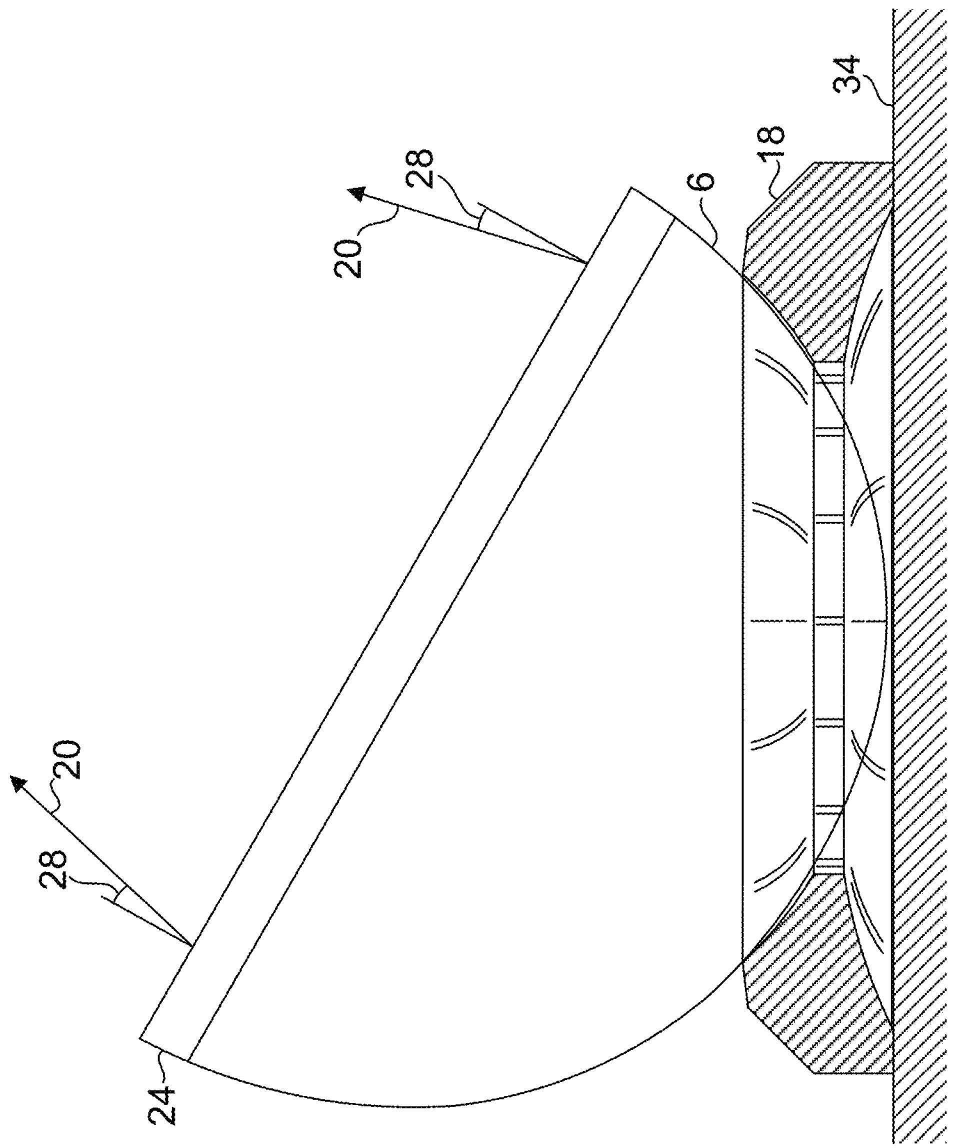
FIG. 12 is a side cross-sectional view of an illumination device with its dome mounted on a cradle.
Figure 13:
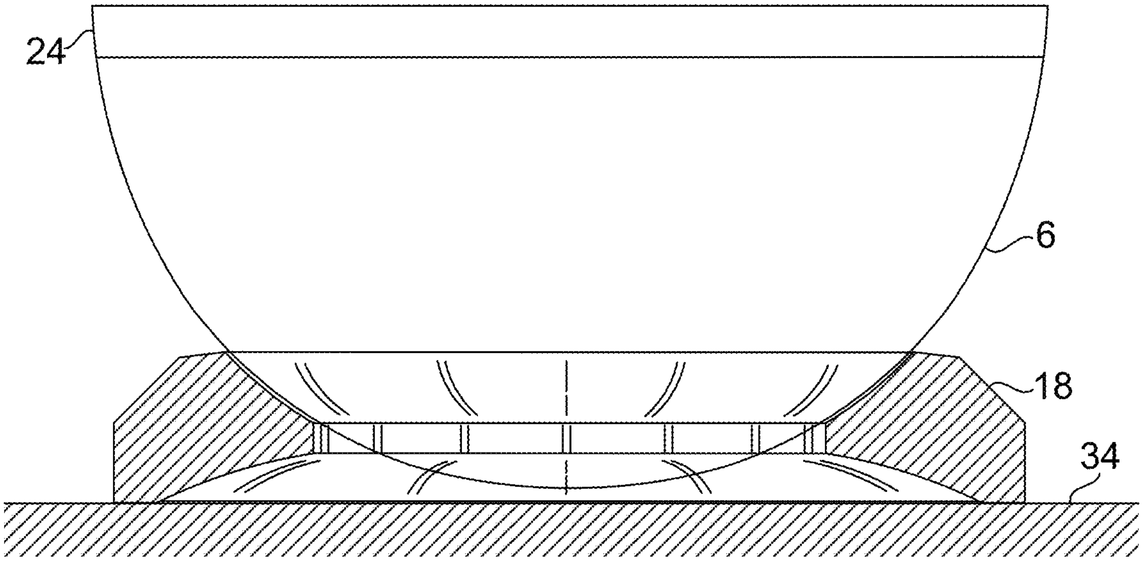
FIG. 13 is a side cross-sectional view of an illumination device with its dome mounted on a cradle where the base of the dome is oriented horizontally so that the light beams from the light emitting devices in the base are directed upwardly to illuminate the ceiling of a living space.

FIG. 11 is a side cross-sectional view of a cradle 18 with diameter 36 to provide an opening that is large enough to allow the surface of the dome 6 to protrude through the opening to stably support the dome 6 of the illumination device 2 in various orientations as shown in FIGS. 12 and 13. The interior surface of the opening is a concave surface 38 that matches the convex surface of the dome 6. FIG. 12 is a side cross-sectional view of an illumination device 2 with dome 6 mounted on a cradle 18. The base 24 of the illumination device 2 on which the light emitting devices 30 are disposed, can be inclined in multiple preferred orientations to illuminate an object of interest such as an ornamental plant in a living space or to provide mood lighting. A limiting orientation occurs as the edge of the base approaches the edge of the cradle. FIG. 13 is a side cross-sectional view of an illumination device 2 with dome 6 mounted on a cradle 18 where the base 24 of the dome 6 is oriented horizontally so that the light beams 20 from the light emitting devices on the base 24 are directed upwardly to illuminate the ceiling of a living space for mood lighting. It is also conceivable that the handhold member be picked up or separated from the cradle 18 to be used as a portable light source, e.g., a handheld flashlight in a darkened surrounding.

Figure 14:
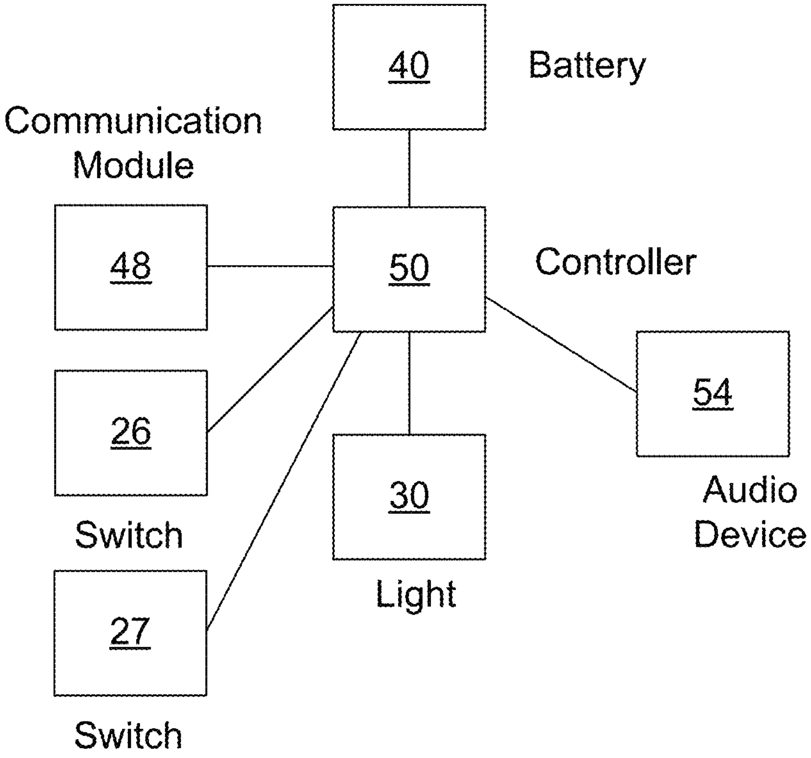
FIG. 14 illustrates a graphical system schematic of a controller functionally connected to a communication module, switch, light emitting device, audio device and battery.

FIG. 14 illustrates a graphical system schematic of a controller 50 functionally connected to a communication module 48, switches 26, 27 and light emitting devices 30. The controller 50 and any devices functionally connected to it may be powered by a battery 40. In the embodiment shown, an audio device 54 is further functionally connected to the controller 50. For instance, the audio device 54 can be configured to enable delivery of a prerecorded message to the patient where such delivery can be associated with the status of switch 26 and/or switch 27. In one embodiment, the communication module is configured to communicate wirelessly with a mobile device, e.g., a mobile phone, where the light emitting devices 30 can be controlled, e.g., turned on or off wirelessly from the mobile device.

Figure 15:
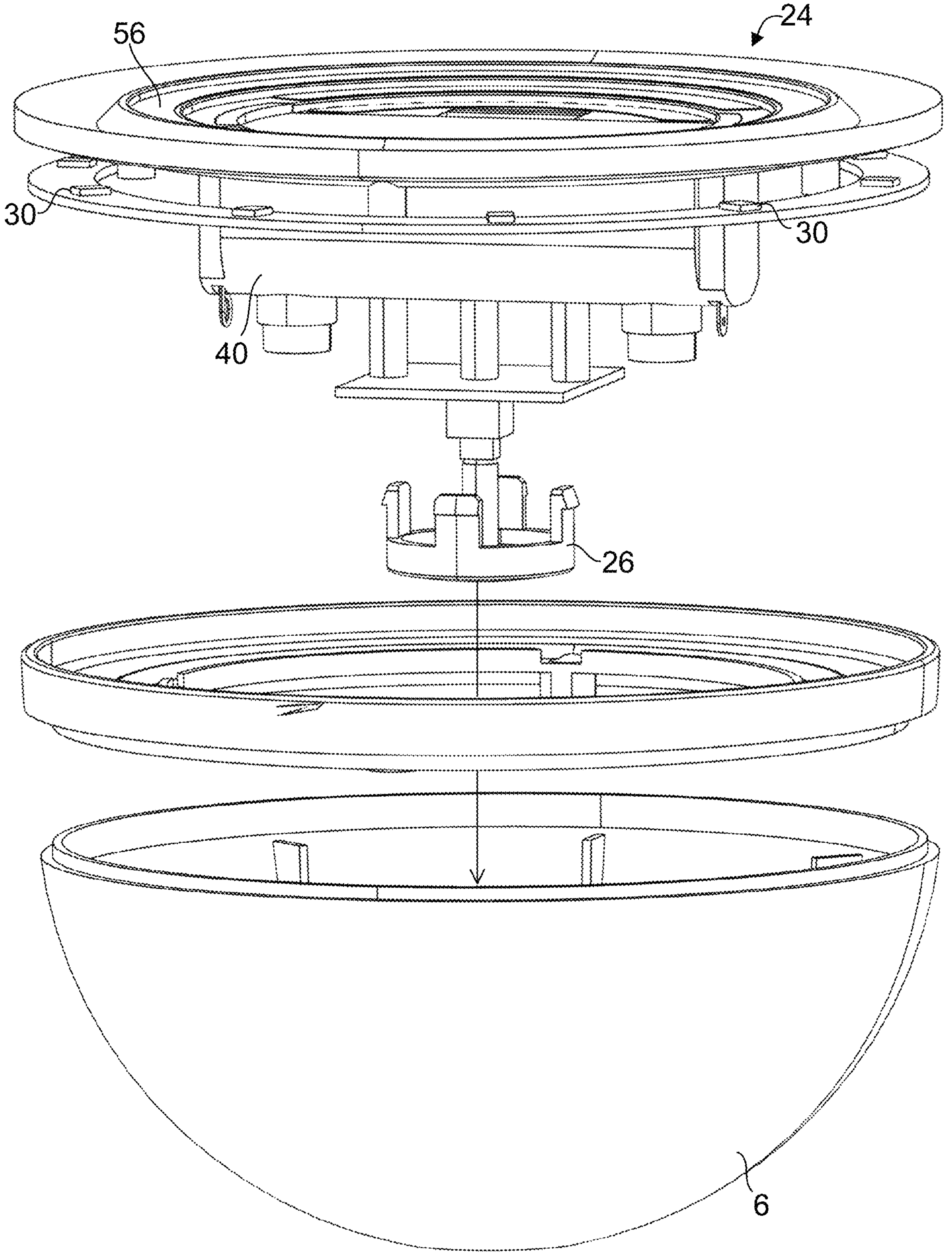
FIG. 15 is a side perspective exploded view depicting the interior details of the illumination device.

FIG. 15 is a side perspective exploded view depicting the interior details of the illumination device 2 showing a manner in which the dome 6 mounts to the base 24, and the construction of the upper portion of base including the stair stepping rings 56, the light emitting devices 30, the battery 40, and the pushbutton switch 26. It shall be noted that, in this embodiment, switch 27 shown elsewhere herein is absent here. The internal cavity of the handhold member provides space to house the power supply and electronics.

Figure 16:
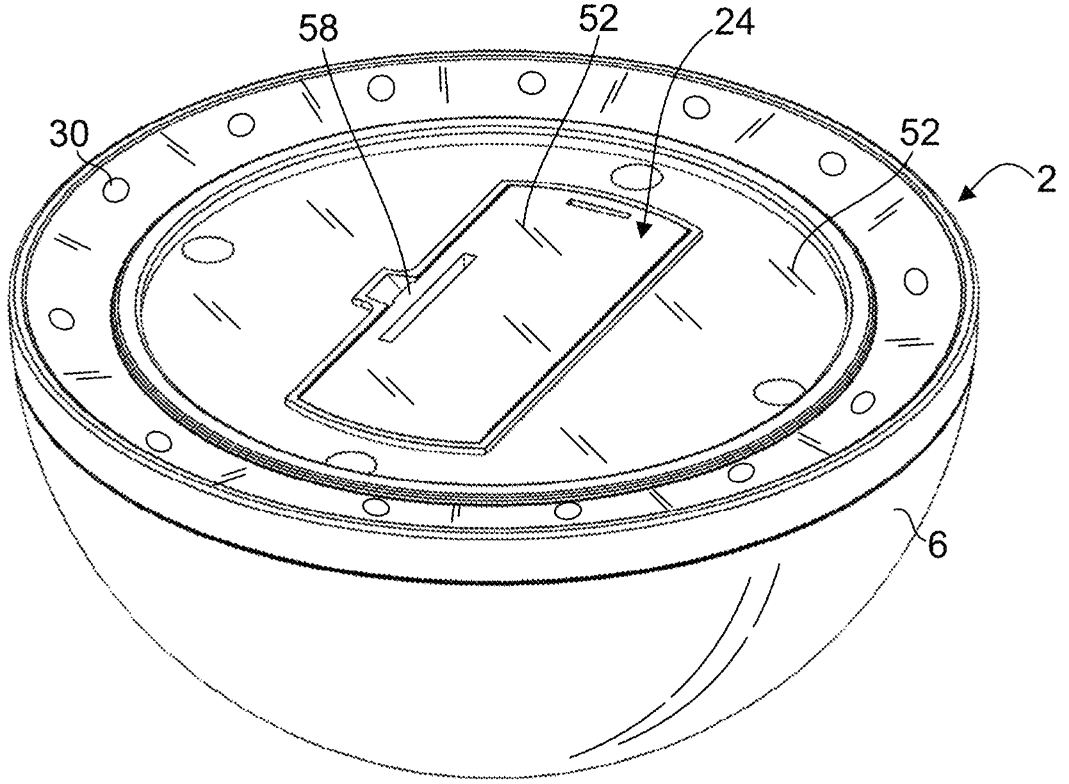
FIG. 16 is a perspective view of the base of one embodiment of a present illumination device, showing a friction pad and a battery removal door disposed in the base.

FIG. 16 is a perspective view of the base of one embodiment of a present illumination device, showing a friction pad 52 and a battery removal door 58 disposed in the base 24. The friction pad 52 can be constructed from a resilient material, e.g., rubber, such that when compressed against a bottle cap, it provides sufficient grip to the user's hand twist action to loosen the bottle cap with respect to the bottle. Here, the base 24 is a flat area, i.e., without a series of stepped rings, e.g., those disclosed in FIG. 6. Therefore, the bottle cap opener of this embodiment of a present illumination device can be used on any bottle with a cap that fits in the flat area of the base 24, although the ability to center the bottle cap opener with respect to a bottle cap that does not significantly fill the flat area, no longer exists.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. An illumination device comprising:

(a) a handhold member comprising a structure comprising a dome and a base of said dome, said dome configured to be held in a user's hand, within a space outlined by a ring or disposed on a surface; and (b) a plurality of light emitting devices disposed on said base, said plurality of light emitting devices configured to be disposed about a central axis of said base and said plurality of light emitting devices configured to be inclined at an angle towards said central axis, wherein an object disposed on said base can be illuminated.

2. The illumination device of claim 1, wherein said angle is about 5 to about 45 degrees.

3. The illumination device of claim 1, further comprising a pushbutton switch configured to control the activation of said plurality of light emitting devices, wherein said pushbutton switch is disposed on the apex of said dome.

4. The illumination device of claim 1, further comprising a pushbutton switch configured to control the activation of said plurality of light emitting devices, wherein said pushbutton switch is disposed in said base.

5. The illumination device of claim 1, further comprising a bottle cap opener configured to assist in the opening of a bottle, wherein said bottle cap opener is disposed in said base.

6. The illumination device of claim 5, wherein said bottle cap opener comprises a friction pad disposed in said base.

7. The illumination device of claim 5, wherein said bottle cap opener comprises a series of stepped levels each corresponding to a different diameter size of a bottle cap of the bottle.

8. The illumination device of claim 1, further comprising a cradle having a space outlined by said cradle, said space configured to receive said dome at contact surfaces of said cradle.

9. The illumination device of claim 8, wherein said contact surfaces of said cradle are concave surfaces.

10. The illumination device of claim 1, wherein at least one of said plurality of light emitting devices is a light source selected from the group consisting of a light emitting diode (LED), an incandescent lamp, a halogen lamp, a compact fluorescent lamp (CFL), high intensity discharge (HID) lamp, a gas discharge lamp and a laser diode.

11. An illumination device comprising:

(a) a handhold member comprising a structure comprising a dome and a base of said dome, said dome configured to be held in a user's hand;

(b) a plurality of light emitting devices disposed on said base, said plurality of light emitting devices configured to be disposed about a central axis of said base; and (c) a cradle having a space outlined by said cradle, wherein said space is configured to receive said dome at contact surfaces of said cradle such that said handhold member is positionable in a plurality of orientations.

12. The illumination device of claim 11, wherein said plurality of light emitting devices are configured to be inclined at an angle towards said central axis.

13. The illumination device of claim 12, wherein said angle is about 5 to about 45 degrees.

14. The illumination device of claim 11, further comprising a pushbutton switch configured to control the activation of said plurality of light emitting devices, wherein said pushbutton switch is disposed on the apex of said dome.

15. The illumination device of claim 11, further comprising a pushbutton switch configured to control the activation of said plurality of light emitting devices, wherein said pushbutton switch is disposed in said base.

16. The illumination device of claim 11, further comprising a bottle cap opener configured to assist in the opening of a bottle, wherein said bottle cap opener is disposed in said base.

17. The illumination device of claim 16, wherein said bottle cap opener comprises a friction pad disposed in said base.

18. The illumination device of claim 16, wherein said bottle cap opener comprises a series of stepped levels each corresponding to a different diameter size of a bottle cap of the bottle.

19. The illumination device of claim 11, wherein said contact surfaces of said cradle are concave surfaces.

20. The illumination device of claim 11, wherein at least one of said plurality of light emitting devices is a light source selected from the group consisting of a light emitting diode (LED), an incandescent lamp, a halogen lamp, a compact fluorescent lamp (CFL), high intensity discharge (HID) lamp, a gas discharge lamp and a laser diode.

* * * * *